Nov. 17, 1959     P. H. NELSON     2,912,713
TELESCOPING TRACK FOR A SLIDING DOOR
Filed Feb. 18, 1957
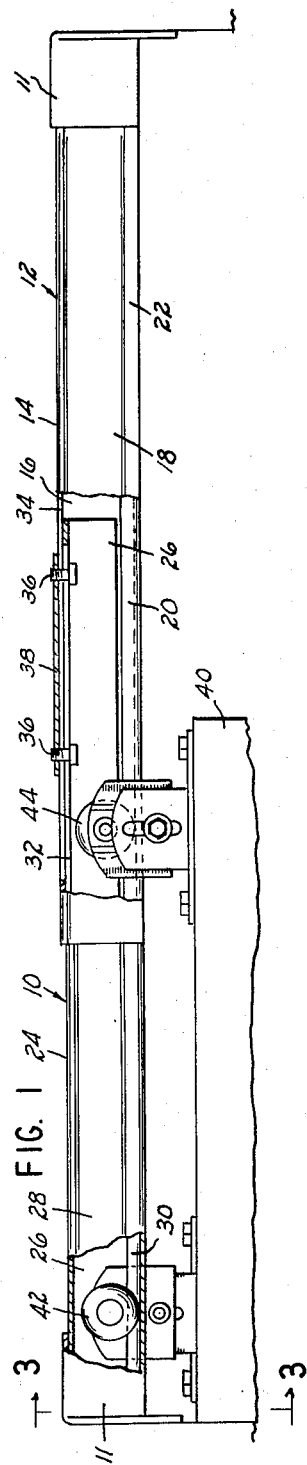
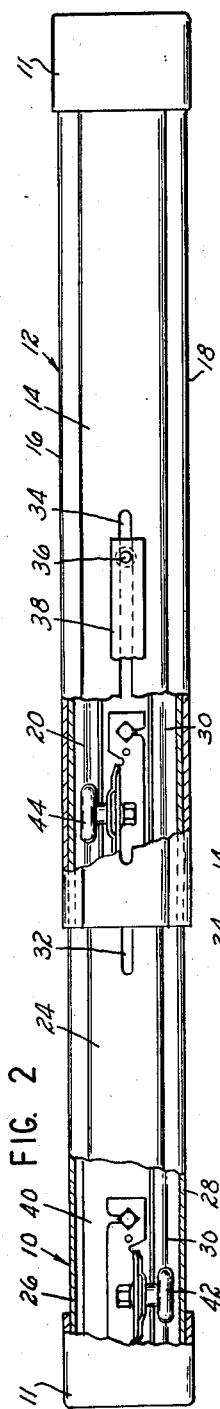
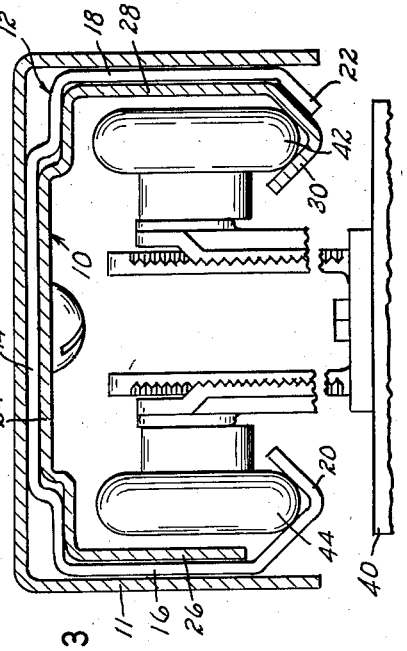
INVENTOR.
PAUL H. NELSON
BY
*Lindsey and Prutzman*
ATTORNEYS

United States Patent Office 2,912,713
Patented Nov. 17, 1959

2,912,713

TELESCOPING TRACK FOR A SLIDING DOOR

Paul H. Nelson, Plainville, Conn., assignor to The Stanley Works, New Britain, Conn., a corporation of Connecticut Application February 18, 1957, Serial No. 640,932

1 Claim. (Cl. 16—95)

This invention relates to a door supporting guide track of a novel and improved construction for use with a sliding door.

It is the object of this invention to provide for use with a sliding door a novel and improved door supporting guide track of the type adapted to be mounted adjacent the top of a door opening which is longitudinally adjustable to permit its use with doors having a wide range of widths; which will provide smooth operation of the door along the full length of the track assembly in any adjusted position thereof; which is simple and economical to fabricate; and which is simple to adjust and install.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claim.

In the drawings:

Fig. 1 is a fragmentary front elevational view, partly in section, of a track constructed in accordance with the invention with a door supported from the track;

Fig. 2 is a top view partly in section of the track assembly and door of Fig. 1; and Fig. 3 is an enlarged fragmentary cross-sectional view along the line 3—3 of Fig. 1.

With reference to the drawing, a sliding door track assembly constructed in accordance with the invention, comprises a pair of elongated telescoping track members 10 and 12, generally channel-shaped in cross section. A pair of brackets 11 are mounted on the outer ends of the track members for supporting the track assembly on the side of a door opening adjacent the top thereof. With particular reference to Fig. 3, the outer track member 12 comprises a base 14 having depending flanges 16 and 18 extending along opposite edges thereof. The flange 16 terminates at its lower end in a V-shape guide track 20 disposed inwardly of the track assembly and extending longitudinally of the flange 16. The oppositely disposed flange 18 of the outer track member terminates at its lower end in a lip 22 turned inwardly of the track assembly and extending longitudinally of the flange 18.

The inner track member 10 comprises a base 24 and a pair of flanges 26 and 28, depending from opposite sides of the base. The flange 26 terminates above the guide track 20 of the outer track member, and the flange 28 terminates at its lower end in a V-shape guide track 30 disposed inwardly of the track assembly and extending longitudinally of the flange 28. The outer surface of the track 30, as can be seen in Fig. 3, is slidably supported on the inwardly turned lip 22 of the outer track member.

The bases of the track members 10 and 12 are provided with elongated registrable slots 32, 34, respectively, through which extend screws 36 which are threadably engaged with a plate 38 whereby the track members may be detachably secured in any desired adjusted position relative to each other.

In the installation of a track assembly, constructed in accordance with the invention, the track members are located adjacent the top of a door opening and adjusted relative to each other in accordance with the width of the door opening. During adjustment of the track members relative to each other, they are guided by the sliding engagement of the lip 22 of the outer member and the track 30 of the inner member as well as by the screws 36 in the slots 32, 34. When the track members are adjusted in the desired relative position, the screws 36 are tightened to provide a rigid track assembly and the track assembly secured to the door frame. A door 40, having rollers 42, 44 mounted on its top surface adjacent the opposite ends thereof, is supported on the track assembly. The roller 42 which is disposed nearer the outer end of the inner track member is engaged in the track 30 of the inner track member and the roller 44 which is disposed nearer the outer end of the outer track member is engaged with the track 20 of the outer track member.

It should be apparent from the drawing, taken in connection with the above description that, regardless of the adjusted position of the track members relative to each other, or the position of the door relative to the track, the rollers of the door will, during movement of the door, be engaged, respectively, by a single unitary track. Door movement between the ends of the track assembly will thus be smooth and uninterrupted regardless of the adjusted position of the track members.

As should be apparent from the drawing, a track assembly, constructed in accordance with the invention, may be used with doors having widths ranging from that equal to approximately one-half the length of one of the track members to that approximately equal to the combined length of the track members. Additionally, the track assembly is simple and economical to fabricate, the majority of parts, and particularly the track members 10 and 12, being preferably formed of sheet metal. Further, as can be seen from the above description and the drawing, the adjustment and installation of the track assembly is simple and straight forward and may be accomplished by a single workman, without assistance.

I claim:

An assembly for mounting a sliding door for sliding movement transversely of a door opening comprising a pair of telescoping inner and outer channel members, the inner channel member having one depending edge flange which is planar throughout and a second depending edge flange which has an inwardly turned lower portion forming a roller guide track, the outer channel member having a first depending edge flange engaging the outer surface of said one depending edge flange and being turned inwardly at the lower edge thereof to form a roller guide track and having a second edge flange engaging the outer surface of the second depending edge flange of the inner member and being turned inwardly at the lower edge thereof in engagement with said inwardly turned lower portion thereof, each of said guide tracks being of greater length than the maximum distance of travel of the door, clamping means extending between the channel members for securing the channels in longitudinally adjusted position with the tracks extending parallel to each other in opposite directions and being horizontally spaced apart at the telescoped portion of the channel members, and a pair of rollers having means for attachment to opposite ends of the top of a door, one roller being engaged in the track of the inner channel member and the other roller being engaged in the track of the outer channel member.

References Cited in the file of this patent

UNITED STATES PATENTS

| | | |
|---|---|---|
| 1,428,023 | Frantz | Sept. 5, 1922 |
| 2,683,891 | Rosenbaum | July 20, 1954 |
| 2,726,420 | Kemp | Dec. 13, 1955 |
| 2,757,804 | Sadwin | Aug. 7, 1956 |
| 2,791,005 | Thompson | May 7, 1957 |

FOREIGN PATENTS

| | | |
|---|---|---|
| 428,736 | Great Britain | May 17, 1935 |